United States Patent [19]

Iwanicki et al.

[11] Patent Number: 4,564,003
[45] Date of Patent: Jan. 14, 1986

[54] SOLAR/GAS HEATER

[75] Inventors: Walter Iwanicki; Brian Duane, both of Adelaide, Australia

[73] Assignee: The Commonwealth of Australia, Canberra, Australia

[21] Appl. No.: 633,067

[22] PCT Filed: Mar. 26, 1981

[86] PCT No.: PCT/AU81/00037
§ 371 Date: Nov. 25, 1981
§ 102(e) Date: Nov. 25, 1981

[87] PCT Pub. No.: WO81/02774
PCT Pub. Date: Oct. 1, 1981

Related U.S. Application Data

[63] Continuation of Ser. No. 328,597, Nov. 25, 1981, abandoned.

[30] Foreign Application Priority Data

Mar. 26, 1980 [AU] Australia .................... PE2925

[51] Int. Cl.[4] ................................ F24J 3/02
[52] U.S. Cl. ...................... 126/427; 126/351; 126/437; 236/24; 251/65; 251/129.11
[58] Field of Search .......... 126/351, 427, 437; 350/606; 403/DIG. 1; 236/23, 24; 251/133

[56] References Cited

U.S. PATENT DOCUMENTS

| | | | |
|---|---|---|---|
| 1,338,644 | 4/1920 | Arthur et al. | 126/427 X |
| 2,122,821 | 7/1938 | Mohr | 126/427 X |
| 3,446,986 | 5/1969 | Cox | 340/606 |
| 3,670,807 | 6/1972 | Muller | 165/39 |
| 3,815,813 | 6/1974 | Charron et al. | 236/23 |
| 4,061,132 | 12/1977 | Ashton et al. | 126/427 X |
| 4,159,017 | 6/1979 | Novi | 126/427 |
| 4,257,397 | 3/1981 | Gouyou-Beauchamps | 126/427 |

FOREIGN PATENT DOCUMENTS

| | | | |
|---|---|---|---|
| 510752 | 7/1955 | Italy | 403/DIG. 1 |
| 52-109641 | 9/1977 | Japan . | |
| 55-92813 | 7/1980 | Japan | 126/351 |
| 55-102824 | 8/1980 | Japan | 126/351 |
| 2012408 | 7/1979 | United Kingdom | 126/351 |

Primary Examiner—Samuel Scott
Assistant Examiner—Allen J. Flanigan
Attorney, Agent, or Firm—Cushman, Darby & Cushman

[57] ABSTRACT

An instantaneous gas domestic hot water system incorporating a solar heating panel (80) connected to a hot water storage cylinder (81), the outlet from the hot water storage cylinder passing through a heating tube assembly (15) adapted to be heated by a gas burner (13). The outlet from the heating tube assembly is connected to a flow switch (4) and a temperature sensing device (14), the flow switch being connected through an electrical control system (10) to operate a control gas valve (11) and a main gas control (5) to control the flow of gas to a pilot burner (6) which is ignited on sensing of the flow of hot water (3) with the temperature sensing unit (14) controlling the control valve (11) to regulate the flow of gas to the main burner (13) to maintain the water at the water at the water at the outlet (83) at a desired temperature.

4 Claims, 5 Drawing Figures

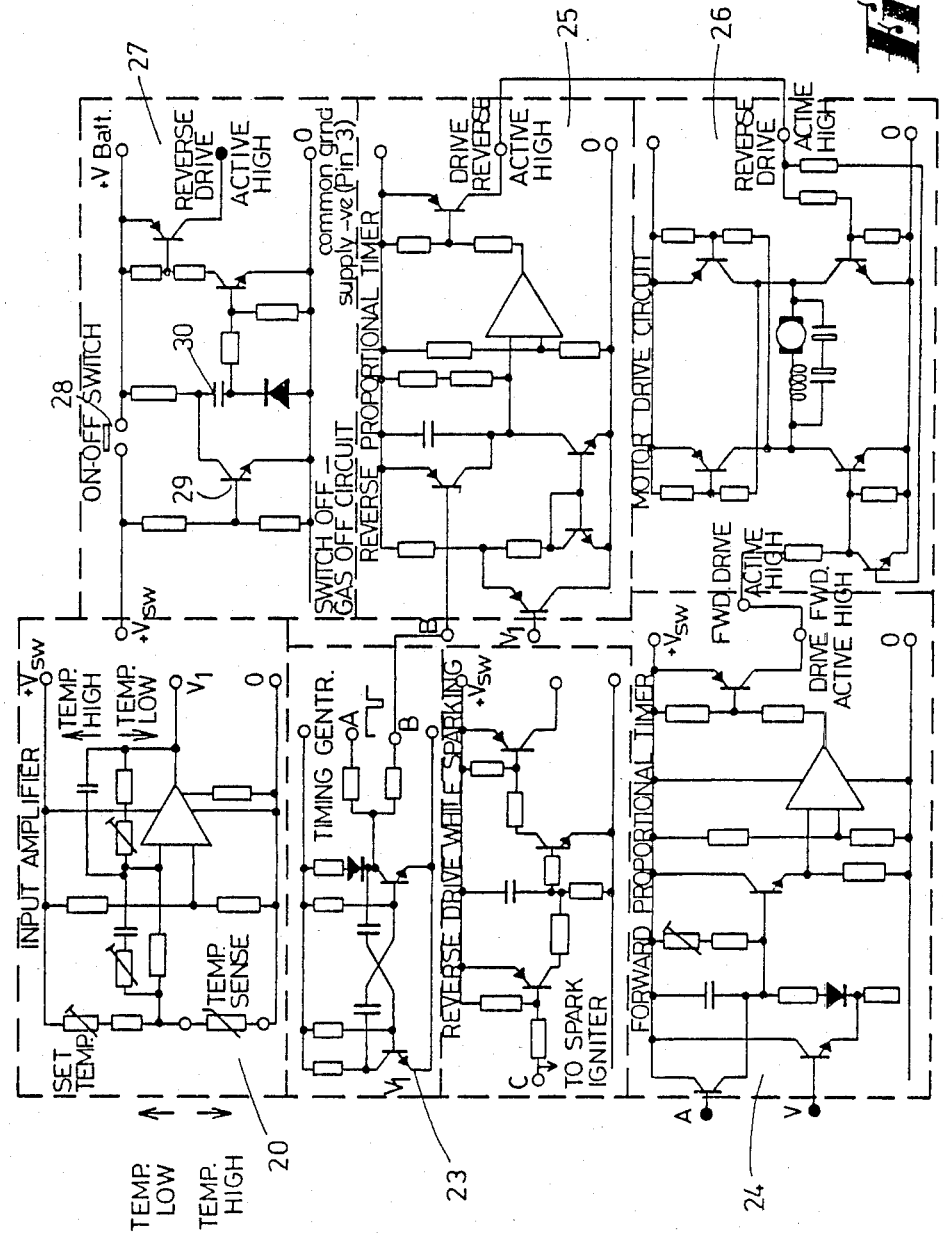

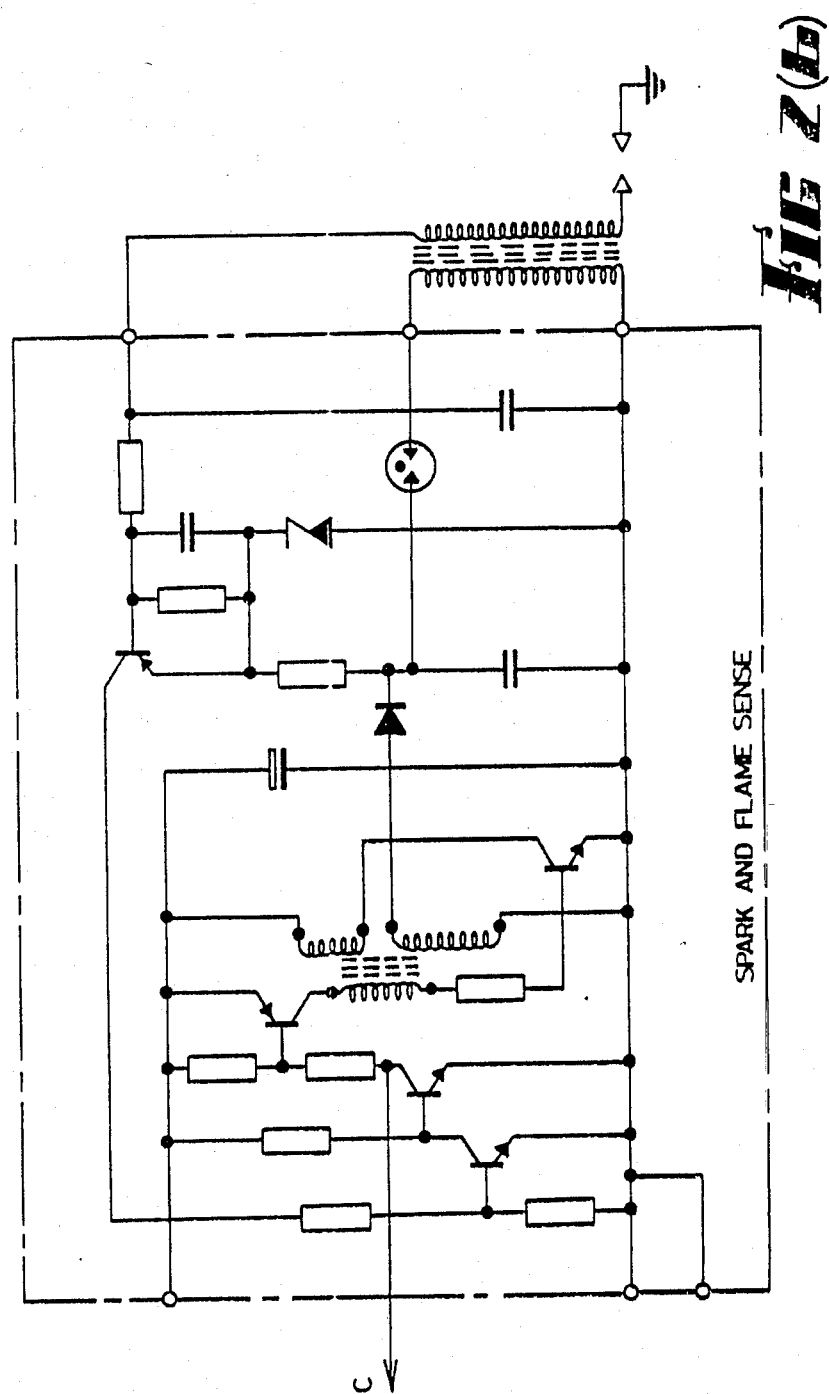

SOLAR/GAS HEATER

This is a continuation of application Ser. No. 328,597, filed Nov. 25, 1981, now abandoned.

This invention relates to a solar/gas heater particularly adapted for heating the water to provide hot water in a domestic situation.

BACKGROUND OF THE INVENTION

At the present time there has been developing a great interest in the utilization of solar heat for the supply of domestic hot water, and many of these systems are incorporated with an electrical heating system to maintain a satisfactory supply of hot water during periods when there is insufficient solar energy absorbed by the solar heating panel to maintain a satisfactory hot water supply. Also solar/gas storage systems are presently available.

However while these are satisfactory, many homes are supplied with a gas supply, either being reticulated or being supplied by storage cylinders and it is an object of this invention to provide a suitable instantaneous type gas domestic water heater.

STATEMENT OF THE INVENTION

In a broad form of the invention there is provided a gas domestic hot water system connected to a water supply, the water passing through a heating tube assembly adapted to be heated by a gas burner. The outlet from the heating tube assembly is connected to a flow switch and a temperature sensing device, the flow switch being connected through an electrical control system to operate a main gas control to control the flow of gas which is ignited on sensing of the flow of hot water with the temperature sensing controlling the control valve to regulate the flow of gas to the main burner.

BRIEF DESCRIPTION OF THE DRAWINGS

FIGS. 2(a) and 2(b) are a circuit diagram of the control unit,

Figure 1:
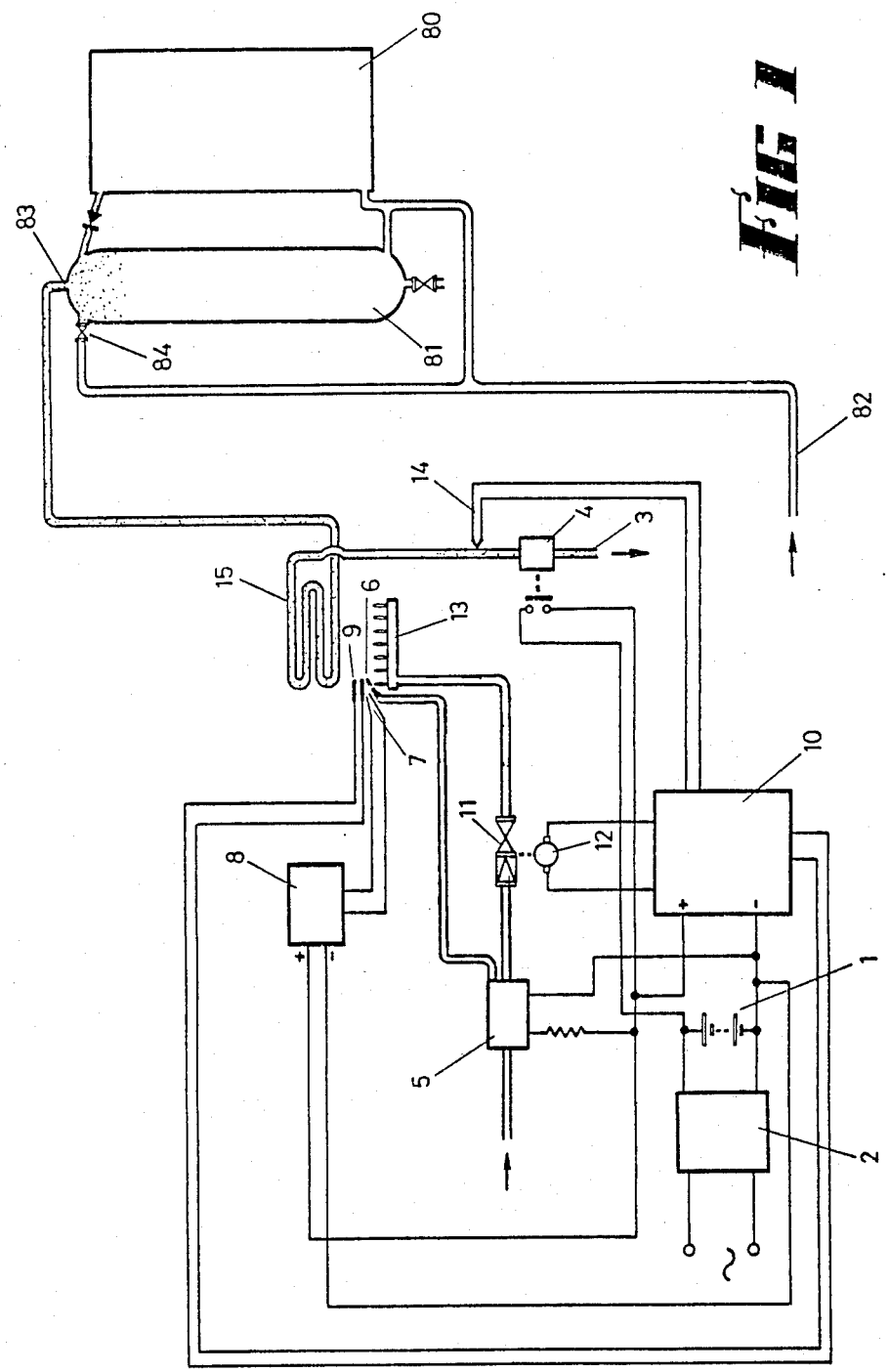
FIG. 1 is a diagrammatic drawing of the invention.
Figure 3:
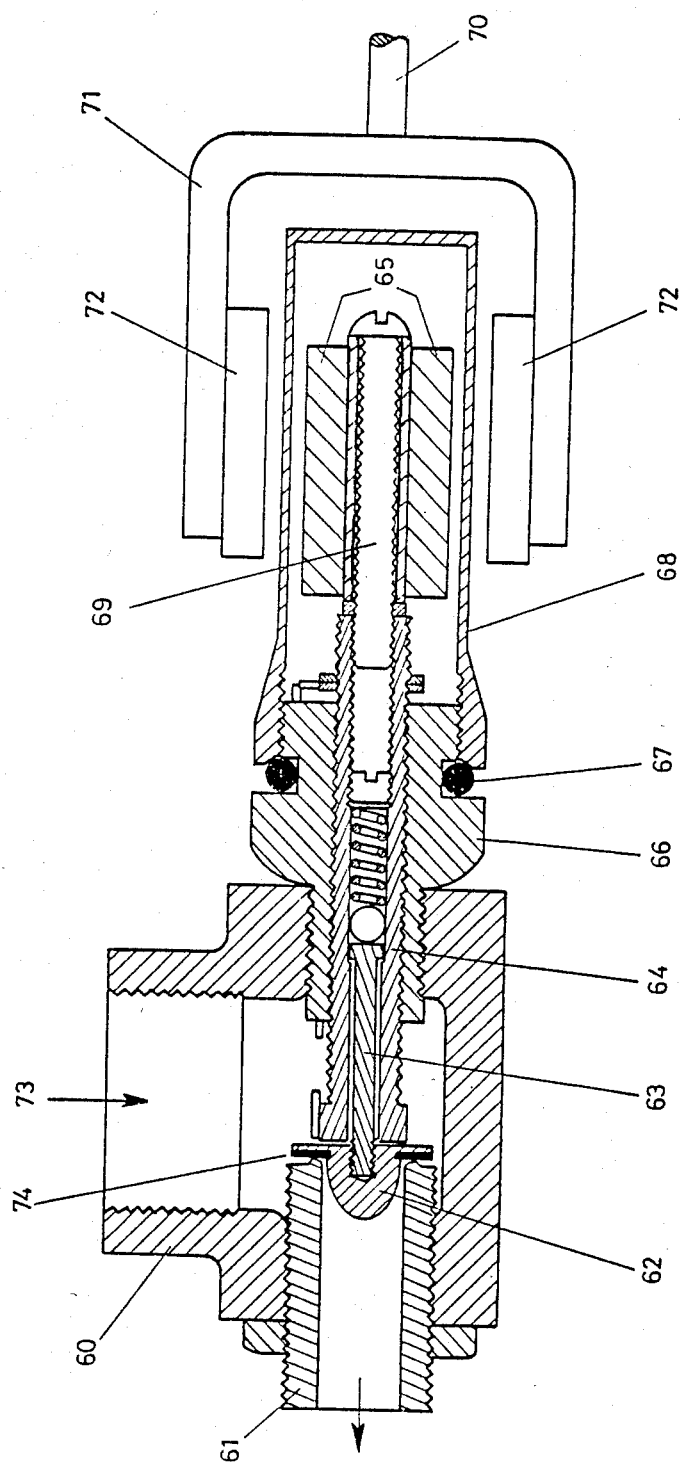
FIG. 3 shows a gas control valve.
Figure 4:
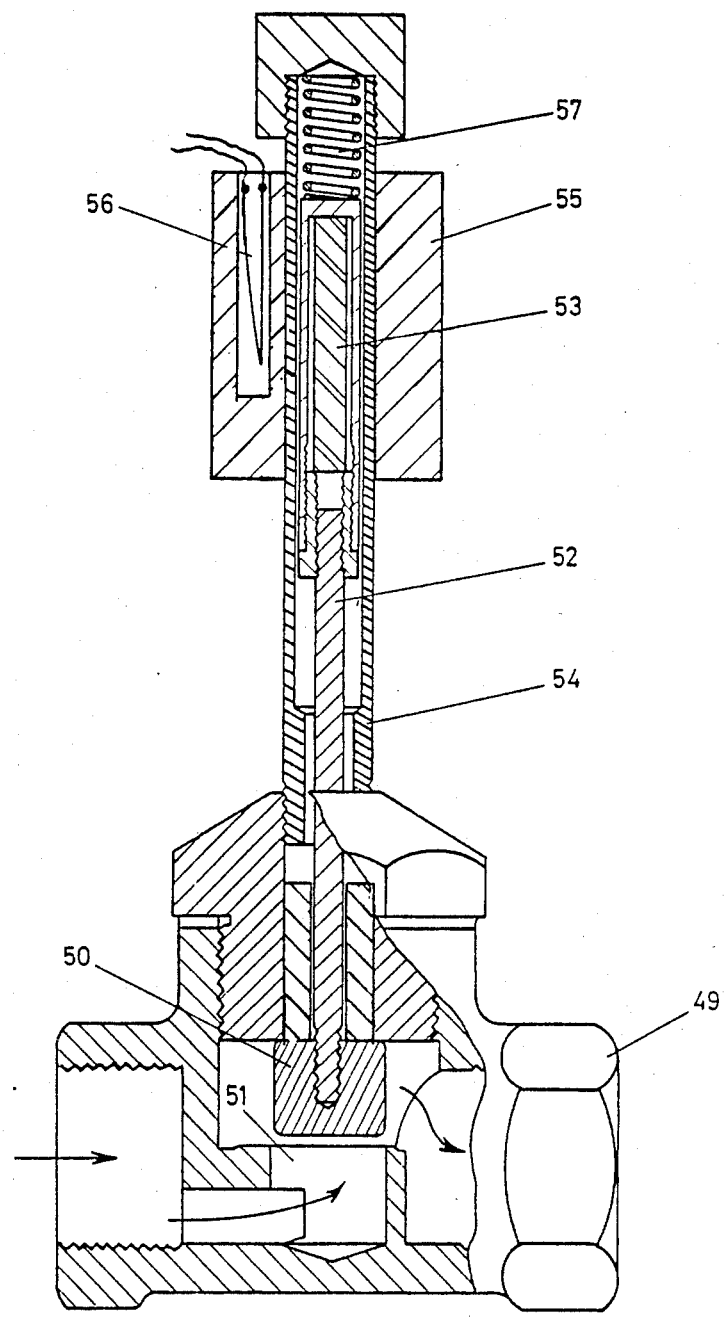
FIG. 4 shows a magnetic flow switch.

In a preferred form of the invention the electrical circuit is provided with rechargeable batteries 1 continuously rechargeable by charger 2 supplied by electrical mains power supply so that even in the event of an electrical mains power failure the unit is still operable.

In operation as soon as there is a flow of hot water through hot water outlet 3a flow switch 4 is activated by the flow of hot water which then in turn activates a main gas valve 5 to allow a flow of gas to the pilot jet 6 and to initiate an igniter 7 through igniter control 8 to ignite the pilot flame. Upon ignition an iron rod sensing device 9 senses the flame and in turn activates a main control 10 which then opens the control and gas control valve 11 by a motor drive 12 to supply the gas to the main burner 13. The main electrical control 10 is under the influence of a temperature sensing unit 14 which senses the temperature of the water passing outwardly from the heating tube assembly 15 to thus activate the motorized control 12 to operate gas control valve 11 to regulate the flow of gas to the main burner 13 to maintain the outlet water temperature at a satisfactory level.

The motorized control and gas control valve is under the control of a motor control unit which is adapted to drive the motor controlling the gas control valve with a pulsing movement. Thus a dead zone is selected within which the value of the controlled variable results in the controller remaining inactive. The temperature sensing device which is connected to the motor control unit determines whether the value lies in the dead zone in which case no pulsing occurs, the value lies below the dead zone in which case pulsing occurs to open the gas control valve or the value lies above the dead zone in which case pulsing occurs to close the gas control valve. The controller can be adjusted so that the angle turned per pulse is essentially fixed but the pulse frequency can be adjusted manually or automatically. Alternatively the pulse frequency can be fixed but the angle turned is adjustable either manually or automatically and in a third alternative the cycle time is essentially fixed but the angle turned/time off relationship is adjusted manually or automatically.

Thus the temperature control circuit is intended to simulate the time constants involved in the gas part of the system thereby giving water at an outlet temperature controlled within acceptable limits as the water at the inlet varies in temperature depending on the solar collector's efficiency in preheating the water during the day.

One form of sensing unit as shown in FIG. 2(a) could be a conventional thermister which is a miniature encapsulated temperature sensor which is designed to respond quickly to changes in ambient temperature. This thermister is connected to an operational amplifier circuit 20 connected in a bridge circuit including a resistance 21 which is for adjustment of the temperature and is pre-set to the desired temperature.

Amplifier gain is determined by a further resistance 22 and the greater the amplifier gain the smaller the temperature band over which the outlet goes from fully high to fully low.

The control unit also includes a timing generator 23, which can be a timing multi-vibrator to set up the time interval over which the temperature is assessed via voltage VI and within which the time proportional pulse drives the motor clockwise or anticlockwise depending upon the value of a voltage proportional to the temperature assessed at the start of each time interval at output A and B. Also included is a forward proportional timer 24 which depending upon the sensed temperature via the applied voltage, the circuit for the forward proportional timer must provide the pulsing drive to the motor in the forward direction.

Similarly there is a reverse proportional timer 25 in which the drive is generated to run the motor in an anticlockwise direction. These are connected in turn to the motor drive circuit 26, and this circuit is so arranged that should forward and reverse drive be applied to the signal input simultaneously the safer of the two, that is, the reverse drive signal overrides the forward and the motor is reversed thus closing the gas control valve.

The switchoff—gasoff circuit gives the safety control. When the switch 28 is closed transistor 29 is held on and the capacitor 30 is discharged. When the switch 28 is opened and transistor 29 turned off capacitor 30 charges slowly to drive the motor in reverse until the capacitor 30 is charged.

The portion of this circuit "reverse drive while sparking" interconnects the ignition and control circuit (FIG. 2(b)) and the reverse motor drive line. The output signal at C on FIG. 2(b) is low while the invertor generating the high voltage spark is operating. During the flame and monitoring mode point C is not held low for most of the time, and the reverse drive while sparking circuit integrates this drive signal. While C is oscillating for the major part of the time the reverse drive signal is generated but is removed when the oscillator drops back to the flame monitoring mode.

The magnetic flow switch 4 for sensing the flow of hot water can comprise a body 49 in which a spring loaded valve 50 is adapted to close on the valve seat 51 when there is no flow of water. However immediately there being a flow of water this flow will cause the valve 50 to move opening the valve, the valve 50 being such that it opens fully from the valve seat 51 and through the surrounding valve flow passage so that if there is any flow the valve must open completely.

The valve 50 is connected by a valve stem 52 to a magnet 53, the magnet 53 and stem 52 all being mounted in a sheath 54. The sheath 54 at its outer end also is provided with a mounting block 55 on which is mounted a reed switch 56, the arrangement being such that when the plug valve 50 is opened that the magnet 53 is moved to close the contacts of the reed switch 56.

The valve stem 52 is provided at its upper end with a return spring 57 mounted within the sheath 54 such that when there is a cessation of flow that the spring 57 immediately closes the valve.

The motorized control and gas control valve 11 is preferably such that the gas control valve controlling the gas flow is completely isolated electrically from the driving motor, and to this extent the coupling drive between the motor and the gas control valve is preferably by a magnetic drive.

As the motorized control and gas control valve 11 is to control and regulate the flow of gas depending upon the temperature requirements of the water, the gas control valve has a valve body 60 and includes an axial outlet valve seat 61 which is closed by a shaped valve 62. This shaped valve is supported by a support pin 63 in a rotating shaft 64, which rotating shaft 64 is connected to a series of magnets 65. The rotating shaft 64 is mounted in a shaft assembly fitting 66 which is sealed by O ring 67 to a cap 68 extending over the end of the rotating shaft 64 and its mounting screw 69, which supports the magnets 65. The motor driving shaft 70 is provided with a yoke 71 carrying magnets 72 so that the yoke magnets 72 are in a relative position to the magnets 65 connected to the rotating shaft 64, so that the rotating shaft 64 will move in unison with the yoke 71.

The inlet 73 to the gas control valve is radial into the valve seat 61, and the shaped valve 62 includes a rubber washer 74 sealing against the valve seat when the shaped valve 62 is in its closed position.

The main gas valve 5 which can close off the gas supply and also regulates the flow to the pilot burner 6 can be of conventional type which is again controlled by the flow switch 4.

The gas ignition controller can be conventional gas ignition system, and the sensing unit can be an ionization electrode to sense the presence of the pilot flame to thus activate the main control unit to open the motorized control and gas control valve to regulate the flow to the main burner.

The instantaneous gas heater can be utilized in many differing situations. For example as shown the heater is combined with a solar heater panel connected to a water storage cylinder 81 provided with a cold water inlet 82. The outlet 83 of the storage cylinder 81 is connected to a heating tube assembly. The cold water supply is also connected to the upper portion of the storage cylinder 81 by a cold water mixing thermostat 84 so that if the temperature of the water in the cylinder is above a certain limit, on hot water being drawn the valve 84 automatically opens controlled by the thermostat to lower the temperature of the water flowing into the outlet to the required degree.

The instantaneous heater can be connected directly to a cold water supply, or any other source of heated water, such as a source of waste heat.

Thus there is provided according to the invention a gas heater/booster for a solar hot water system in which the pilot flame does not burn continuously, but is only supplied with gas and ignited upon the flow of hot water from the water storage cylinder of the system.

Thus the heater and burner and all controls could be incorporated into the solar panel itself so that at one end there could be the storage container, and at the other end of the panel there can be a housing for the burner and controls and the only leads to the unit would be the gas supply line, water supply and also the electrical power to operate the battery charger.

Although one form of the invention has been described in some detail it is so to be realized that the invention is not to be limited thereto but can include various modifications falling within the spirit and scope of the invention.

We claim:

1. A domestic hot water system comprising in combination an instantaneous gas water heater, a solar water heater, and a hot water storage reservoir, said solar water heater being connected to the hot water storage reservoir to heat the water therein, said instantaneous gas hot water heater comprising a heating tube assembly connected to said hot water storage reservoir to receive water therefrom, a gas burner for supplying heat to said heating tube assembly, and an outlet from said heating tube assembly for delivering heater water to a consumer, said gas burner including a pilot burner and ignition means for said pilot burner, and control means to control the instantaneous gas hot water heater, said control means including a flow switch sensing water flow in said outlet, a temperature sensing device sensing the temperature of water flowing in said outlet, a main gas valve and a gas control valve, said flow switch controlling said main gas valve, said temperature sensing device being connected to said gas control valve to control the gas flow, said temperature sensing device being connected to a motor control unit controlling an electric motor operating the gas control valve, the motor control unit delivering electrical pulses to drive the electric motor with a pulsing movement to actuate the gas control valve, said pulses actuating said gas control valve in a stepwise movement, the motor control unit having a dead zone between upper and lower limits, said upper and lower limits being determined by the upper and lower limits of the temperature of water flowing in said outlet, whereby when said temperature sensed by said temperature sensing device is below the lower limit of said dead zone said motor is pulsed to supply gas to said pilot burner and the ignition means ignites said pilot burner which ignites said burner which burns at full capacity, and when said temperature reaches said dead zone said motor is no longer pulsed, and when said temperature exceeds the upper limit of said dead zone, the motor is pulsed to terminate said gas flow to said burner and said pilot burner.

2. A domestic hot water system as defined in claim 1 characterised in that said burner includes a pilot burner supplied with gas, a sensing device to sense the presence of said pilot burner to control said gas control valve.

3. A domestic hot water system as defined in claim 1 wherein said flow sensing device comprises a plug valve moveable by the flow of water, said plug valve being connected to a magnet to operate a reed switch on movement of said magnet.

4. A domestic hot water system as defined in claim 1 characterized in that the cold water is supplied to an inlet to the storage reservoir at the bottom thereof, and to the bottom of the solar water heater, a further cold water inlet being connected via a dilution control valve to the water storage reservoir adjacent the hot water outlet thereof, whereby the water flowing in the outlet may be reduced in temperature by operation of the dilution control valve when the temperature of the water in the reservoir exceeds the controlled temperature of the water.

* * * * *